(12) United States Patent
Mailly et al.

(10) Patent No.: US 10,196,867 B2
(45) Date of Patent: Feb. 5, 2019

(54) SYSTEM AND METHOD FOR POSITIONING OF TUBULAR MEMBERS

(71) Applicant: SHELL OIL COMPANY, Houston, TX (US)

(72) Inventors: Benjamin Mailly, Cambridge, MA (US); Eric Daniel Nelson, Cambridge, MA (US); Yinxiao Liu, Boston, MA (US); Hugh Enxing, Cambridge, MA (US); Wei Yu, Salem, MA (US); Ranxing Nancy Li, Boston, MA (US); Daniel I. Harjes, Acton, MA (US); Teddy Sedalor, Brookline, MA (US); Hector Padilla, Chelsea, MA (US); Leland Howe Smith, Roxbury, MA (US); Davis King, Cambridge, MA (US)

(73) Assignee: SHELL OIL COMPANY, Houston, TX (US)

( * ) Notice: Subject to any disclaimer, the term of this patent is extended or adjusted under 35 U.S.C. 154(b) by 32 days.

(21) Appl. No.: 15/539,989

(22) PCT Filed: Dec. 22, 2015

(86) PCT No.: PCT/US2015/067306
§ 371 (c)(1),
(2) Date: Jun. 26, 2017

(87) PCT Pub. No.: WO2016/106294
PCT Pub. Date: Jun. 30, 2016

(65) Prior Publication Data
US 2017/0362905 A1    Dec. 21, 2017

Related U.S. Application Data

(60) Provisional application No. 62/095,837, filed on Dec. 23, 2014.

(51) Int. Cl.
*G06K 9/00* (2006.01)
*E21B 19/16* (2006.01)
(Continued)

(52) U.S. Cl.
CPC .......... *E21B 19/165* (2013.01); *G06K 9/4642* (2013.01); *G06K 9/6269* (2013.01);
(Continued)

(58) Field of Classification Search
USPC ....... 382/100, 103, 106, 155, 162, 168–172, 382/173, 180, 181, 189, 199, 201, 209,
(Continued)

(56) References Cited

U.S. PATENT DOCUMENTS 2,870,659 A * 1/1959 Burg ..................... B23B 39/205
                                                173/13
5,675,214 A * 10/1997 Geven ..................... H01J 61/09
                                                313/356
(Continued)

FOREIGN PATENT DOCUMENTS

CA      2870659 A1    10/2013
CN    101837782 A      9/2010
(Continued)

OTHER PUBLICATIONS

Ahmadi et al., "Contour-Based Object Detection Using Max-Margin Hough Transform", Machine Vision and Image Processing (MVIP), 7th Iranian, IEEE, Nov. 16, 2011, pp. 1-5, XP032087701.
(Continued)

*Primary Examiner* — Seyed Azarian (57) ABSTRACT

A system and method for positioning oilfield tubulars on a drilling floor (2), having an automated tubular handling system, to permit alignment and automated make up and break out of threading operations between a stationary tubular (8) and a moving tubular (34), utilizing image
(Continued)

information from radially offset cameras (54, 56), processing the image information to recognize the tubulars within the image and develop position information for said tubulars, combining the position information from the two camera systems to develop three dimensional information for each of the tubulars, developing instructions for the automated tubular handling system to bring the stationary and moving tubulars into vertical alignment and lowering the moving tubular into threaded contact, and engaging an automated hydraulic torque wrench to make up the threaded connection.

14 Claims, 4 Drawing Sheets

(51) Int. Cl.
| | | |
|---|---|---|
| *G06K 9/46* | (2006.01) | |
| *G06K 9/62* | (2006.01) | |
| *G06T 7/277* | (2017.01) | |
| *G06T 7/269* | (2017.01) | |
| *G06N 99/00* | (2010.01) | |
| *B23Q 5/00* | (2006.01) | |
| *E21B 17/042* | (2006.01) | |

(52) U.S. Cl.
CPC ......... *G06K 9/6282* (2013.01); *G06N 99/005* (2013.01); *G06T 7/269* (2017.01); *G06T 7/277* (2017.01); *E21B 17/042* (2013.01); *G06K 9/4652* (2013.01); *G06K 9/6201* (2013.01); *G06T 2207/10016* (2013.01); *G06T 2207/10024* (2013.01); *G06T 2207/20081* (2013.01); *G06T 2207/30164* (2013.01)

(58) Field of Classification Search
USPC ............... 382/219, 232, 254, 260, 274, 276, 382/286–291, 305; 348/46; 701/1; 173/13, 180, 181; 313/356
See application file for complete search history.

(56) References Cited

U.S. PATENT DOCUMENTS

| | | | | |
|---|---|---|---|---|
| 2010/0191391 | A1* | 7/2010 | Zeng | ..................... G01S 13/723 701/1 |
| 2012/0045120 | A1* | 2/2012 | Tate | ..................... G06K 9/6282 382/159 |
| 2013/0271576 | A1* | 10/2013 | Ellis | ..................... G06F 17/5009 348/46 |
| 2013/0275100 | A1 | 10/2013 | Ellis et al. | |
| 2013/0345878 | A1 | 12/2013 | Austefjord et al. | |
| 2014/0233804 | A1* | 8/2014 | Gustavsson | ......... E21B 47/0002 382/103 |

FOREIGN PATENT DOCUMENTS

| | | |
|---|---|---|
| GB | 2510742 A | 8/2014 |
| JP | 2012043156 A | 3/2012 |
| JP | 5675214 B2 | 2/2015 |
| WO | 2013048260 A2 | 4/2013 |
| WO | 2013158652 A2 | 10/2013 |

OTHER PUBLICATIONS

Dalal et al., "Histograms of oriented gradients for human detection", Proceedings of the 2005 IEEE Computer Society Conference on Computer Vision and Pattern Recognition (CVPR), vol. 1, Jun. 20-25, 2005, 8 pages, XP031330347.

Mutto et al., "Time-of-Flight Cameras and Microsoft KinectTM", A user perspective on technology and applications, Springer, Jan. 24, 2013, 116 pages.

International Search Report and Written Opinion received for PCT Patent Application no. PCT/US2015/067306, dated Apr. 29, 2016, 14 pages.

\* cited by examiner

SYSTEM AND METHOD FOR POSITIONING OF TUBULAR MEMBERS

CROSS REFERENCE TO EARLIER APPLICATION

The present application is a National Stage (§ 371) application of PCT/US2015/067306, filed Dec. 22, 2015, which claims priority benefits of U.S. Application No. 62/095,837, filed Dec. 23, 2014, the disclosure of which is incorporated by reference herein.

BACKGROUND

The present invention is directed to a system and method for determining the relative position of tubular members used in drilling for hydrocarbons. More specifically, in certain embodiments, to a system and method of determining the position of a hanging (suspended vertically by a crane, draw works or other device) drilling tubular member relative to a downhole tubular member to permit the automated alignment and makeup or breakout of said tubulars.

The drilling rig floor environment has historically been one of the more dangerous working environments. These activities exposed drilling personnel or "roughnecks" to a variety of health and safety concerns, including working on the catwalk or monkey boards high on the drilling rig derrick, hanging tubulars, power tongs and associated chains, hand injuries when aligning and lowering tubulars, not to mention risks associated with well control or other gases returned with the drilling mud. Early methods called for lifting tubulars on an elevator and manually positioning the hanging tubular to mate up with a tubular that was suspended in a rotary table (downhole tubular). In the context of the present invention, a "tubular" may refer to well casing, drill collar, drill pipe, production tubing, or other tubular members that are threaded together and utilized in the drilling and production of hydrocarbons. Traditionally, roughnecks were required to move tubulars from a tubular storage area, align the hanging tubular with the downhole tubular, lower the hanging tubular to come into contact with the downhole tubular and utilize hydraulic tongs to apply torque to "spin-up" the tubular, such that the threads in the downhole tubular engaged the hanging tubular and were tightened. The hanging tubular was then utilized as part of the drilling process. The tripping or removal of tubulars from a well, called for roughnecks to apply hydraulic tongs to breakout or disengage the threads between two sections of tubular, with the uppermost (hanging) tubular being moved by hoist to a rack or other storage area.

In an effort to improve safety, there have been a number of improvements in the above processes. Semi-automated tubular handling equipment has been used to move tubulars to and from a storage area to the drilling floor and in position for makeup. Automated torque wrenches, known as iron roughnecks, have been devised which, under control from the driller, advance toward a mated hanging and downhole tubulars to makeup or breakout the threaded tubular connections. Despite these advances, there remains the problem of alignment of the hanging tubular with respect to the downhole tubular. Current practices still require two or more roughnecks on the drill floor to align the hanging tubular with the downhole tubular before the driller can lower the hanging tubular and engage the iron roughnecks. Thus, drill floor personnel remain exposed to the dangerous drilling environment.

It is desirable to develop a system and method for determining the position of the hanging tubular relative to the downhole tubular, without human intervention on the drilling rig floor. It is further desirable to utilize the positioning information as input to automated pipe handling and positioning system to align the tubular and place their respective threaded ends into contact with each other prior to engagement of the iron roughneck when making up the tubulars. The same positioning information may be used to safely disengage the hanging tubular from the downhole tubular following breakout during tripping operations.

SUMMARY

The present disclosure generally relates to a machine vision system and method for determining the relative position in three dimensions of a hanging drilling tubular with respect to a downhole tubular and bringing the tubulars into axial alignment.

In one embodiment, the system is comprised of a two camera systems, each system having time of flight (ToF) camera in coplanar arrangement with a color video camera, the camera systems being radially offset from each other. The digital information from each system is combined and processed by a computer to develop three dimensional position information of the hanging tubular relative to the downhole tubular;

In another embodiment, the present disclosure provides for the position information to be forwarded from the computer to a SCADA driven automated pipe-handling system, the pipe-handling system utilizing continuous relative position information from the camera systems and computer to move the hanging tubular into axial alignment with the downhole tubular and to lower the hanging tubular into threaded contact with the downhole tubular. At which time, the driller may engage the iron roughnecks to makeup the threaded connection between the downhole tubular and the hanging tubular.

In another embodiment, during tripping operations on the drilling floor, following breakout of a hanging tubular from the downhole tubular, the present disclosure provides for the camera system to develop three dimensional position information to be forwarded to said SCADA driven automatic pipe-handling system to ensure that the hanging tubular is fully disengaged and clear of the downhole tubular prior to the pipe-handling moving it to a storage area.

In yet another embodiment, each camera system is comprised of a ToF camera, and two video color cameras, the video cameras in a flanking co-planar arrangement with the ToF camera.

In yet another embodiment, each camera system is comprised of a projector infrared (IR) ToF ("active light") camera in combination with one or more color video cameras.

In yet another embodiment, each camera system is comprised of a single CCD camera.

BRIEF DESCRIPTIONS OF THE DRAWINGS

A more complete and thorough understanding of the present embodiments and advantages hereof may be acquired by referring to the following description taken in conjunction with the accompanying drawings.

DETAILED DESCRIPTION

The description that follows includes exemplary apparatus, methods, techniques, and/or instruction sequences that embody techniques of the inventive subject matter. It is understood that the invention may be practiced without reference to the specific embodiments and details set forth below.

The present disclosure relates to a machine vision system that may be used to determine the three dimensional position and distance of a hanging tubular suspended above a drilling rig floor by an automated pipe handling system, relative to a downhole tubular protruding above the drilling rig floor.

In certain embodiments, the position and distance information is provided to a SCADA system controlling the automated pipe handling system on semi-continuous basis to bring the hanging tubular into axial alignment with the downhole tubular and into threaded contact. Once brought into threaded contact, the threaded connection between the downhole tubular and the hanging tubular may be tightened, or "made up" utilizing an automated wrench system or roughneck, which is comprised of a torque tong and a spinning tong.

In certain embodiments, during removal of the tubular from a well, following breakout, or unthreading operations by the iron roughneck, the position and distance information may be used to prevent clashing as between the hanging tubular and the downhole tubular, as the hanging tubular is withdrawn from the downhole tubular and placed in storage utilizing an automated pipe handling system. In such instances the automated pipe handling system is once again controlled by a SCADA system that is provided the three dimensional (3D) position and distance information of the hanging tubular relative to the downhole tubular.

Figure 1:
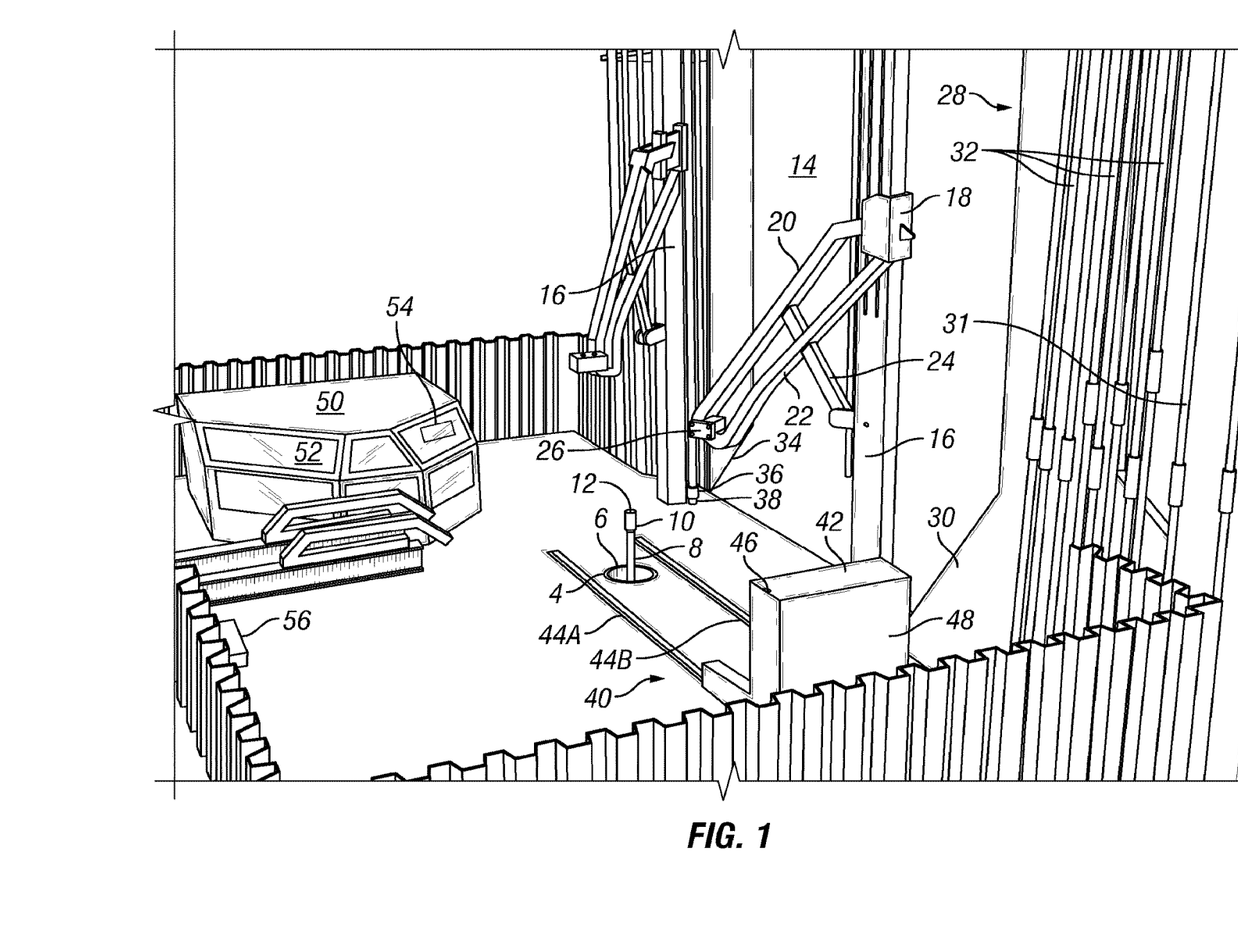
FIG. 1 is a simplified illustration of a drilling rig floor.

Referring now to FIG. 1, FIG. 1 illustrates a simplified view of a modern drilling rig floor. In FIG. 1, illustrates the drilling floor 2, having a drill center hole 4, a rotary table 6 therein, and a downhole tubular 8 protruding from the drilling floor 2 through the rotary table 6. It will be appreciated that the present invention may be utilized in conjunction with a top drive system (not shown) as an alternative to a rotary table. In FIG. 1, the downhole tubular 8 is shown as a drill string having a box end 10 and female pressure threads 12. The downhole tubular 8 is held in place by automated drilling slips (not shown) as are well known in the art. FIG. 1 depicts a drilling rig tower 14 configuration to support drilling operations, such as those manufactured by Huisman Equipment B.V. A simplified depiction of the Huisman automated pipe handling system is depicted in 14. It will be appreciated that there exist a number of commercially available automated pipe handling systems that are capable of assembling shorter lengths of tubulars into longer "strings", storing the tubular strings, retrieving tubulars from a storage areas and positioning them relative to the downhole tubular 8, such as the HydraRacker system manufactured by National Oilwell Varco.

The exemplary pipe handling system depicted in Figure is comprised of a central member 16, capable of rotating between rotatable pipe storage carousel 28, where other drill pipe 32 is stored, and the drilling floor 2. The pipe handling system 1 further includes a pair of arms 20 and 22, the near end being mounted on a base 18 mounted on the central member 16, the base 18 being capable of being translated up and down central member 16 by cable or screw means (not shown). A gripping clamp 26 is mounted on the distal ends of arms 20 and 22, capable of gripping and holding a tubular relative to the pipe handling system. Further, arms 20 and 22 are capable of rotating in a vertical plane relative to base 18, as the base translates along central member 16 and as moved by articulating arm 24, which is mounted on base 18. It will be understood that there exists a second base 18 (not shown), set of arms 20 and 22, articulating arm 24 and gripping clamp 26 mounted on central member 16 well above the drill floor 2 that act in concert with the lower corresponding members to lift the tubular out of the carousel, raise it above the drill floor level and bring it into position above the drill floor. The rotatable pipe storage carousel 28 is comprised of a lower plate 30 which is below the drill floor, an upper plate (not shown) central spindle 31, and support members 33, in which drill pipe is stored prior to being used. The lower plate the central spindle is rotated by hydraulic systems (not shown) and rotates to present drill pipe 32 for use in drilling operations. In this manner, the central member 16 may be rotated toward the pipe storage carousel 28, arms 20 and 22 moved along base 18 to bring the gripping clamp 26 into contact with drill pipe 32 stored in the carousel 28. The arms 20 and 22 are then raised to move the drill pipe 32 out of the carousel 28 and the central member 16 rotated to bring the drill pipe 32 above the drilling floor 2 and in proximity to the downhole tubular 6.

In FIG. 1, the hanging tubular 34 is depicted as being drill pipe, but could be any of the tubular listed above, provided that the downhole tubular was of a matching type. The hanging tubular 34 lowest end is a pin end 36 connection having male threads 38 that mate with threads 12 in the downhole tubular 8 and provide for pressure sealing as well as structural integrity as between the hanging tubular 34 and downhole tubular 8.

An iron roughneck 40 is depicted in FIG. 1 in a withdrawn position. The iron roughneck 40 includes a frame 42 and hydraulic power unit (not shown) that moves the iron roughneck 40 towards and away from the rotary table 6 along tracks 44A and 44B. The iron roughneck 40 further includes a torque tong 48, and a spinning tong 46, that permit the iron roughneck 40 to hold downhole tubular 8 in position and rotate hanging tubular 34 to make up the connection between tubulars 8 and 34. It will be appreciated that in the view of FIG. 1, that the spinning tone 46 and torque tong 48 are not depicted, but their function and purpose are well known to one in the oilfield. While the iron roughneck 40 depicted in FIG. 1 is a drill floor mounted system, there exist other iron rough neck systems, all of which may be utilized within the embodiments discussed herein.

A driller's station 50 is depicted off to the side of the drilling floor 2. The driller's station typically includes instrumentation that includes bit and hook weight, rate of penetration, depth of the bottom hole assembly, rotary rotation rate and torque, mud pump pressure, mud flow rate, as well as mud gain/loss information, mud temperature, mud density, drilling controls, pipe handling controls, iron roughneck controls, station keeping information (where offshore) and any number of customizable sets of gauges and controls, which are not relevant to the disclosure.

It will be appreciated that even in the semi-automated environment of FIG. 1, that some aspects still require manual intervention. While hanging tubular 34 may be brought into close proximity to downhole tubular 8, the driller requires that the tubular be aligned and in threaded contact before activating the iron roughneck 40. This still requires manual intervention, placing the roughnecks in a dangerous environment. Attempts have been made to automate the positioning of the hanging tubular 34 relative to the downhole tubular. US Patent Publication 20130345878 discloses a videometric system wherein a color camera is used to assure that the downhole tubular 8 and hanging tubular 34 are in the proper vertical position prior to engagement of the iron roughneck 40, thereby ensuring that the torque tong 48 properly seats on the downhole tubular 8 and the spinning tong 46 seats on the hanging tubular. While this prior art system assures that the tubular are of the proper height (a z axis determination), it also assumes that the tubular are properly aligned with respect to a common longitudinal axis, i.e., the Z-axis for each of the tubulars are coaxially located in the X-Y plane.

In order to overcome this limitation, the present invention utilizes a camera system 54 mounted behind the glass panels 52 of the driller's station 50. A second camera system 56 is depicted as mounted on the drilling floor 2. Ideally, camera systems 54 and 56 are an equal distance from the drill center 4. While camera systems 54 and 56 are depicted as approximately offset from each other by 90 degrees, it will be appreciated that this radial offset may vary within the scope of the present invention. The present invention utilizes the two camera system 54 and 56 to establish the position of the pin end 36 of hanging tubular 34 relative to the box end 10 of downhole tubular 8 in three dimensional space. That position information is processed to provide control signals to the automated pipe handling system. Once the pin 36 end of the hanging tubular 34 is aligned with the box end 10 of downhole tubular 8 in the X-Y plane, the present invention generates a control signal to lower the hanging tubular 34 toward the downhole tubular, such that threads 12 and 38 are brought into engagement. It will be appreciated that the vertical offset distance between pin end 36 and box end 10 may be set as part of the operation of the present invention.

Machine vision systems have long been in use. The earliest of these being a simple camera capturing two dimensional (2D) data can be effective when used with respect to planar applications in a controlled lighting environment, such as inspections. 2D imaging processing techniques, such as edge detection and template matching algorithms can be used to capture information concerning important features of an item that may be compared to stored information regarding an optimal produced item to determine whether the item meets a pass/fail criteria. However, a single 2D camera does not provide sufficient information that would permit one to deduce position information in a three dimensional (3D) environment.

Figure 2:
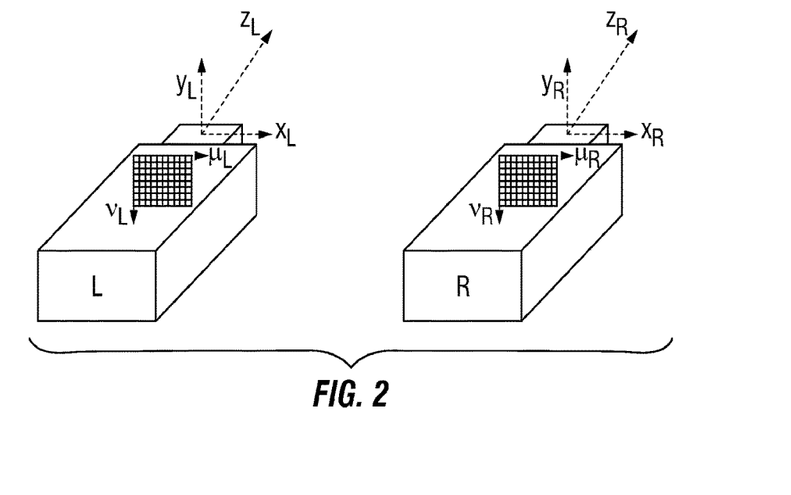
FIG. 2 is a depiction of a digital stereo vision camera system
Figure 3:
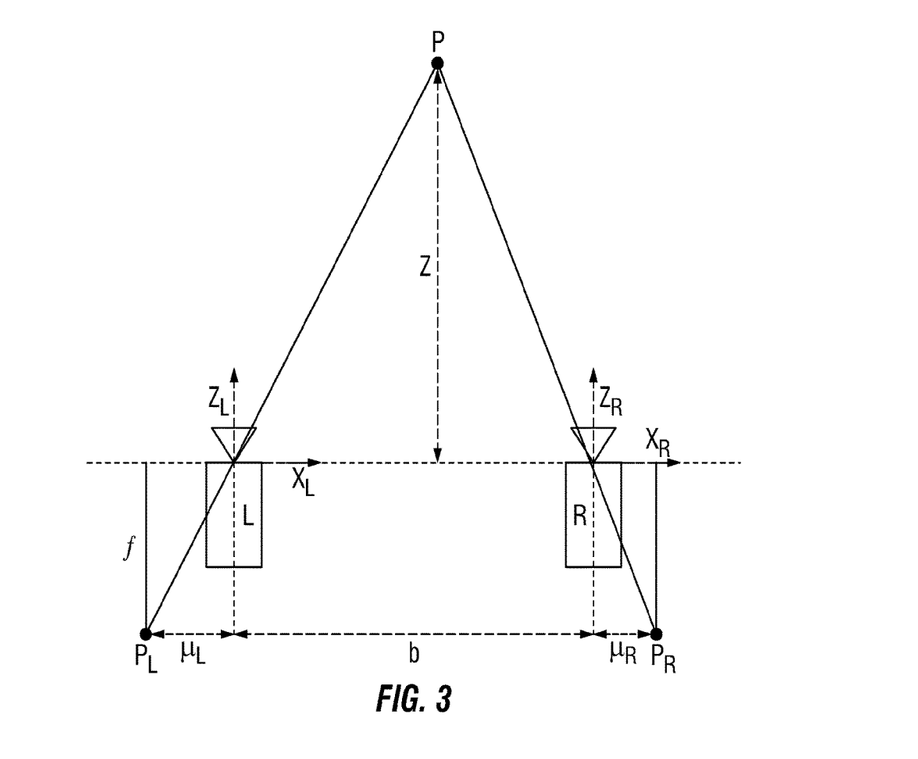
FIG. 3 is a simplified depiction the stereo vision process.
Figure 4:
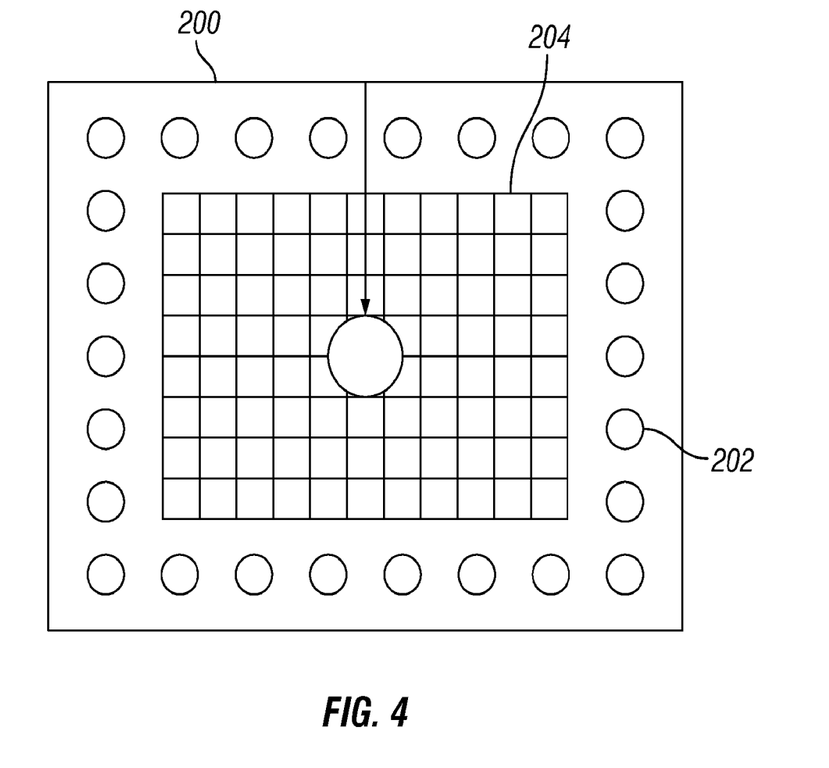
FIG. 4 is a simplified depiction of a matricial time of flight (ToF) camera

Digital cameras used in pairs may be used to determine depth information in addition to edge information, much like human eyesight. FIG. 2 depicts a set of rectified, calibrated, digital video cameras, left camera 100 and right camera 102. Each of the cameras has its own coordinate system at the plane of lens, represented by $X_L$, $Y_L$ and $Z_L$ for left camera 100 and $X_R$, $Y_R$ and $Z_R$ for right camera 102. Digital cameras typically have planar matrices of rectangular sensor cells having photoelectric conversion systems, such as a CMOS or CCD. Planar matrix 104 has a coordinate system $V_L$ and $U_L$, with a single pixel 108 being represented in the matrix. Similarly, matrix 106 has a coordinate system $V_R$ and $U_R$ with a single pixel 110 represented thereon. Determination of the distance to a point is illustrated in FIG. 3. A point P will have coordinates $P=[x, y, z]^t$ at time T with respect to the camera, which will project back to the planar sensors as $P_L=[u_L, v_L]^T$ and $P_L=[u_R, v_R]^T$, where the cameras 100 and 102 have the same vertical position as well, the depth z or distance to point P can be determined by known computational stereoposis algorithms.

The challenge in determining depth in a stereo camera system is a correspondence problem, i.e., given that point P is projected by on camera 102, planar sensor 104 to pixel 108 $p_L$, how does one determine where the corresponding point pixel 110 $p_R$ is in camera 102's image? Solving this correspondence problem can require complex, computationally intensive algorithms, requiring feature detection and template matching. There are a number of other factors that adversely affect stereo vision depth determination, including surface uniformity of the object, and a lack of color variation of the object In the context of the drilling environment, there are additional factors including steam, moisture, lighting and other environment factors which might partially obscure the object being measured. Further, in stereo vision, the depth resolution error is a quadratic function of the distance to the object being measured. Thus, stereo vision by itself would not prove conducive for a camera system that could be used to determine the 3D position of the hanging tubular 34 relative to the downhole tubular 8 with sufficient accuracy.

Other camera systems have been developed to more accurately determine the distance to an object, or depth information, such as a matricial Time of Flight camera, referred to hereafter as simply a ToF system. ToF cameras by themselves are capable of 3D determination. A basic ToF camera consists of an emitter, and a camera sensor, as shown in FIG. 3. The emitter is typically an array of solid state lasers or LEDs 202 operating in the infrared (IR) or near IR arranged about the sensor 204, which is comprised of a multiple CMOS or CCD sensors, each sensor representing a single pixel. The emitter may be pulsed or more likely on and modulated by a continuous wave, such as a sinusoid or a square wave function. The emitted light leaves the camera and strikes the object and is reflected back to the camera sensor. The light entering the sensor includes the reflected light and any ambient light. A band pass filter is placed on the light received by the sensor, such that the measured light is at the same frequency of the emitted light. The change in amplitude, and phase differential of the reflected light is measured and the distance to a point on an imaged object can be estimated by known algorithms. It will be appreciated that the signal processing systems of the ToF are not depicted, as such systems are commercially available.

Yet another type of ToF camera that may be used within the context of the present invention is a coded light projector and ToF camera, in combination with a video camera sensor, as may be found in Microsoft Kinect™ camera utilized in conjunction with Microsoft's Xbox game system. The coded light ToF camera utilizes an infrared coded light projector to project a coded light pattern onto an object which is then detected by the ToF camera and provides a better estimate of. A detailed discussion of the techniques utilized matricial ToF cameras, coded light ToF cameras, calibration and fusion of depth data with standard video camera data may be found in C. Dal Mutto, P. Zanuttigh, G. Cortelazzo, *Time-of Flight Cameras and Microsoft Kinect™, A user perspective on technology and applications*, Springer, Jan. 24, 2013. While ToF cameras are capable of determining the depth or distance to an object, they typically have a low spatial resolution and poor edge definition. The combination of the ToF camera with a standard video feed permits better edge detection and movement. The use of color stereo vision can be used to further improve depth information by utilizing the stereo depth information in conjunction with the time of flight depth information. Imaging systems typically have onboard image processing systems to combine color vision and ToF information. The Kinect system utilizes the Primesensor™ chip produced by Primesense, now Apple, Inc. but other chip set systems are manufactured by Texas Instruments, Canesta, Mesa Imaging and others.

The use of ToF and color camera data may be used to define the feature and depth information for the suspended tubular and the stationary tubular. However, it is insufficient to actually determine the position of the tubular in three dimensional space. When the tubulars are to be mated, the axis of the suspended tubular must be co-axial with that of the stationary tubular and the lowermost part of the suspending positioned above the uppermost part of the stationary tubular. Thus, a single imaging system is insufficient to provide the necessary resolution to achieve this. Accordingly, the present invention provides for two imaging systems. The rotary in the drilling represents the center of the drilling floor, as it represents the axis of the wellbore. In order to provide additional information concerning the position of the stationary and suspended tubular in three dimensional space, the two imaging systems are offset from each other. While the second imaging system may be laterally offset from the first, it is preferred that that the imaging systems are radially offset from each other, with the rotary representing the central point. Preferably, the imaging systems placed at the same relative vertical position with respect to the drilling floor, and radially offset from each other by 90°. It will be appreciated that the other offset angles or varied heights of the imaging systems may be employed as such variations may be accounted for in the software utilized to establish the position of a feature and edge of the tubular in three dimensional space.

The imaging systems of the present invention may consist of a variety of camera combinations. The cameras utilized in the imaging systems are comprised of at least one color video camera. Alternatively, a Time of Flight or ToF camera, either a matricial or a coded light ToF camera may be used in conjunction with the color camera. Additional resolution may be obtained by using a second video camera in combination with the above video camera and ToF camera, thus providing additional color stereo vision information to better resolve depth of features for the tubulars. The ToF camera operates to develop feature and depth data of the tubulars, An output signal comprised of the ToF data, together with the feature data from a digital color video or, feature and depth data, in instance digital color stereo video data, is output to a computer within the present invention. The computer may be a specialized imaging systems computer or a general purpose computer having image processing software loaded thereon.

The computer of the present invention utilizes the digital data to establish position data of the features of the tubulars in three dimensional space. It will be understood that the output signals from both the digital color video camera and the ToF camera include time stamp information that permit the pixels for the respective camera output to be matched. The digital color video or RGB camera data is used to establish a picture of the tubular. In doing so, it must be able to recognize the tubulars from other objects located on the drill floor. Known techniques for image segmentation include background registration to distinguish the tubular from the objects behind it and edge detection to establish the outline of the tubulars, thus providing the computer a picture of the pipe in space. Video optical flow techniques may also be used to track the movement of the tubular. Other techniques may be used to reduce the processing time, such as providing image template data and cylinder fitting to more easily recognize the tubular and its threaded end, and simultaneous localization and mapping or SLAM techniques to establish the tubular shape and position.

The ToF camera data is likewise used to gain a view of the pipe may utilize algorithms similar to the RGB camera processing. In addition, the ToF camera data provides distance information for each pixel in the scene. The processed RGB date and processed ToF data is combines as to time and pixel, resulting in a 3D image of the tubulars. However, the 3D image is only sufficient to establish the position of the tubulars relative to the single camera system. However, this position information is not sufficient to align the tubulars.

Figure 5:
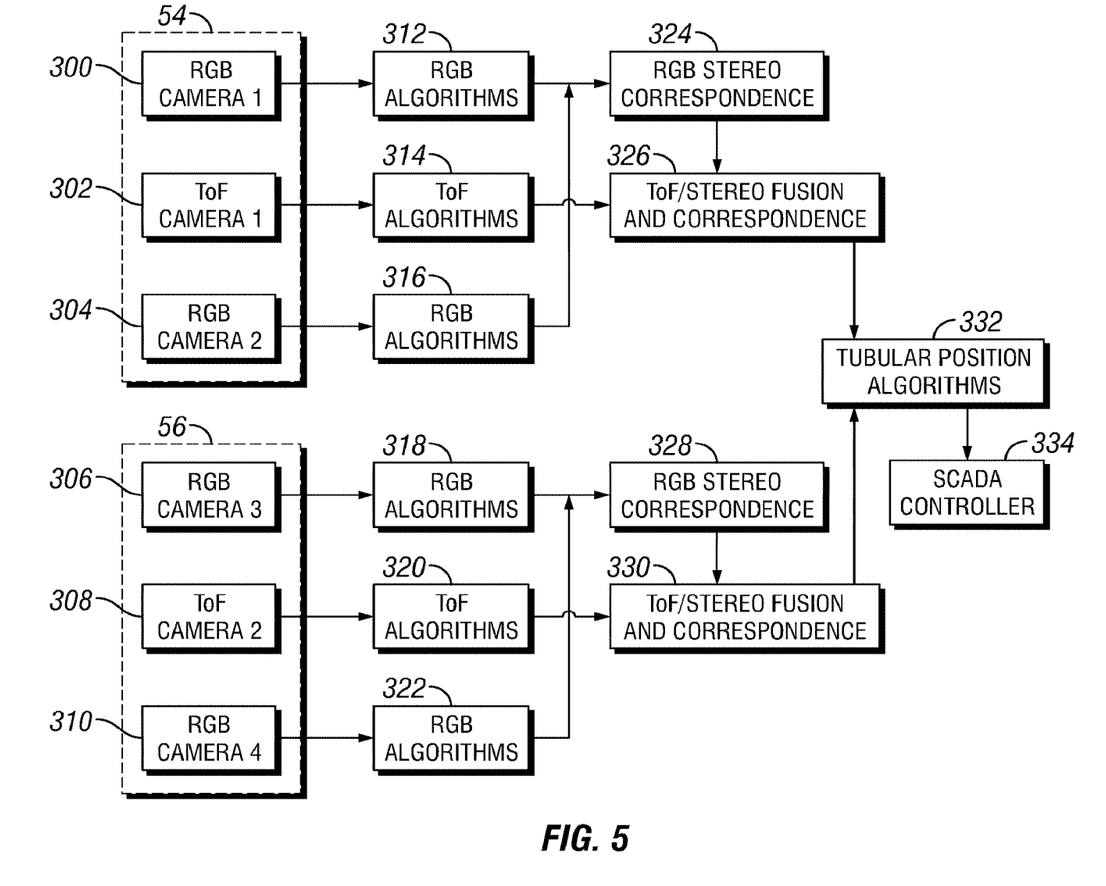
FIG. 5 is a depiction of the operation of camera systems, processing systems and control systems within the scope of the present invention.

FIG. 5 depicts the processing of the camera system data for camera systems 54 and 56, each comprised of two RGB digital cameras and a single ToF camera, cameras 300, 302, and 304, and 306, 308 and 310, respectively. The data from RGB cameras 300, 304, 306, and 308 is processed as described above by image processors 312, 316, 318 and 322 respectively. The ToF data from cameras 302 and 308 is processed by image processors 314 and 320 respectively. The processed image from processors 312 and 316 is then processed to develop a stereo RGB image by processor 324. The stereo image is then combined with the processed ToF depth image data by processor 326 to provide image and depth information of the downhole and suspended tubulars with respect to camera system 54. Similarly, the processed image data from processors 318 and 322 is then combined to form a stereo RGB image by processor 328, with the stereo image being combined with the ToF data from processor 320 to form a combined image by processor 330, which provides image and depth information of the downhole and suspended tubulars with respect to camera system 56. The depth and position information from each camera is used by processor 332 to develop the position of the ends of the downhole and suspended tubulars in 3D space and their relative offset. The position information is then transmitted to SCADA controller 334, which drives the automated tubular handling system to bring the downhole and suspended tubular into axial alignment and then into threaded engagement. While various image processors are depicted in FIG. 5, it will be appreciated that a single image processor system may be used to carry out the same steps.

Alternatively, the computer of the present invention may output the position data of the tubulars to a separate computer, such as a SCADA system, that may be used to control the tubular handling system. In such instance, the SCADA system utilizes the position information to generate positioning instructions to the pipe handling system to bring the tubulars into alignment.

An illustrative image processing technique for determining the position of the tubulars utilizing single RGB cameras is set forth herein. The image data is continuous, but as a practical matter, one must select a time step, or sample time, that will result in a series of instants at which the image processing system will be called upon to recognize the stationary tubular and hanging tubular ends, and determine their position for that time step, and do it in a reasonable amount of time prior to the next time step. It will be appreciated the utilizing current image processing technology, these time steps are small, resulting in almost continuous recognition and position data. Training the image processing system as to what to look for is the most common method of doing so. Image processing systems have been trained to recognize objects, including partially occluded objects, or multiple objects utilizing multiple photographs of the object to be detected, in the present invention, the tubular ends. Moreover the image processing system must be trained to recognize varying profiles, e.g., drill collar profiles, drill pipe profiles, or casing profiles, as may be used during operations. Lastly, it must be recognized that these tubulars are not stationary during make up/break out operations and that the hanging tubular end will be moving relative to the downhole stationary tubular end.

An exemplary method of training an image processing system of the present invention utilizes a modified Histogram Oriented Gradient (HOG) feature extraction and detection based on multiple video images of the specific tubular. The basic HOG technique is set forth in N. Dalal and B. Trigss article *Histograms of Oriented Gradients for Human Detection*, Computer Vision and Pattern Recognition 2005 IEEE Computer Society Conference, pp. 886-893, vol. 1, Institute Electrical and Electronics Engineers, which is hereby incorporated by reference. Utilizing this technique the images are normalized for gamma and color, and utilizing a detection window, or area of investigation, of a set pixel size, that is scanned across the entire image. As the window is scanned gradients are computed for those pixels within the window. The gradients for pixels are then binned to create a weighted vote into spatial and orientation cells. The cells are then combined into larger blocks of cells which are contrast normalized to create a descriptor that is the normalized cell responses from all the blocks in the detection window. The Dalal paper then discusses two different methods of actual detection of image edges using the HOG techniques to establish the presence of an object edge. The HOGs are then collected for the detection window, which in the Dalal paper is used to train a linear Support Vector Machine (SVM), a supervised machine learning model. Having trained the image processor, the same detection window scanning technique is used to identify objects in real time images.

There are a number of shortcomings with the technique disclosed in the Dalal paper, including problems associated with binning of overlapping windows, and the inability to identify multiple objects within a single image. This can lead to suboptimal descriptors as to the edge of an object. In the exemplary method of the present invention, a modified approach to train a HOG is utilized that is capable of detecting multiple objects within a single image. The technique, known as Max-Margin Object Detection (MMOD) which is used to optimize object detection over multiple sub-windows. The MMOD utilizes a tangent plane that is imposed upon the HOG data to improve the approximation of the position of the object. The use of the MMOD technique is discussed in D. King, *Max-Margin Object Detection*, http://arxiv.org/pdf/1502.00046v1.pdf, which is hereby incorporated by reference. The use of the MMOD-HOG technique to train the SVM improves spatial positioning in object detection and permits the identification of multiple objects within a single real time image. It will be appreciated that this is important in detecting and establishing the position of the stationary end of a downhole tubular and the end of the hanging tubular.

While the use of the MMOD-HOG technique improves object detection and spatial positioning, the exemplary embodiment of the present invention further improves the detection and spatial positioning of the object utilizing regression trees. At its most basic, a regression tree recursively splits a data set into two subsets of the data, the split being chosen to minimize the sum of an impurity function of the two child branches, ultimately choosing the branch having the minimal impurity function. The data in that branch undergoes the same partitioning split and the process repeats either until the results of the impurity function meets a stopping criteria, or the data is partitioned to an arbitrarily set level of branching. Tree regression has application in classification and it will be appreciated that there are a number of ways by which to determine how the splits are determined, the impurity function, and stopping criteria. In an exemplary of the present invention, a modification of facial recognition software (see, http://dlib.net) is utilized to further improve the MMOD-HOG object recognition data fitting to the actual image by comparing the intensities of adjacent pixels from the MMOD-HOG position data and attempting to minimize the difference of the sum of squares of a set of pixels from the actual image compared to the approximation developed by MMOD-HOG/SVM recognition data. In the exemplary system, the tree regression is limited to three branching events. The results of the application of the tree regression to the MMOD-HOG/SVM data improves spatial positioning to within a pixel of the object's actual position.

It will be appreciated that the hanging tubular will be in motion and the ability of the image processing system to provide spatial position data will be affected by that motion. In order to improve the spatial positioning information, the results of the tree regression position data are processed through a parallel set of Kalman filters. Each Kalman filter is identical except for the process noise terms which vary from very small to very large. At each time step the image processing system uses the output from the Kalman filter that had the most accurate prediction of the position of the object on the previous image time step. This provides an adaptive process noise term into a Kalman filter. The result is that when the object is not moving very much, the filters make strong assumptions about the pipe positions and give very accurate outputs. When the object is moving quickly in the camera field of vision, the filters will quickly react to changes in object position but give slightly less accurate outputs.

While the exemplary image processing system utilizes detection window MMOD-HOG detection, together with tree regression and Kalman filters to detect and accurately estimate the position of the moving hanging tubular and the down hole stationary tubular, it will be appreciated that there are other image processing methodologies that may be employed to detect and establish the spatial location of the hanging tubular and the downhole stationary tubular. The position information is then combined with the second camera system per above, to provide the location of the tubulars in three dimensional space. The spatial information may then be provided to an automated tubular handling system.

It is within the scope of the present invention to utilize any automated pipe handling system that is capable of suspending a tubular and bringing it to the drilling floor, provided the pipe handling system is capable of three dimensional positioning and has the necessary algorithms to accurately move the hanging tubular in response to the location information such that it will align with the stationary downhole tubular.

Whereas the present invention has been described in particular relation to the drawings attached hereto, it will be appreciated that further modifications apart from those illustrated herein may be made within the scope and spirit of the present invention.

The invention claimed is:

1. A system for positioning oil field threaded tubulars in a drilling floor environment, the system comprising:
   an automated tubular handling system for moving a tubular, said tubular having thread connections on each end, from a tubular storage area proximate to said drilling floor, said automated tubular handling system being capable of orienting said moving tubular in a vertical position and into proximity of a stationary tubular, said stationary tubular having thread connections on each end and vertically positioned in a rotary table in said drilling floor, the uppermost end of said stationary tubular having a thread connection capable of mating with the thread connection on the lower end of the moving tubular;

at least two imaging systems, each imaging system comprised of at least one camera, the imaging systems being radially offset from each other relative to the center of rotary table, and each providing real time images of said stationary tubular and said moving tubular;

an image processing system that receives the real time images from the imaging systems, the image processing system applying a histogram of oriented gradient training and recognition technique to detect the stationary and moving tubulars and generating real time estimates of location data for the stationary and moving tubulars in three dimensional space on the drilling floor; and transmitting the real time location data to the automated tubular handling system, said tubular handling system processing the real time location information to bring the moving tubular into vertical alignment with the stationary tubular, and lowering the moving tubular into contact with the stationary tubular.

2. The system of claim 1, wherein each of said imaging systems is comprised of at least one color camera.

3. The system of claim 1, wherein the image processing system for detection and generation of real time estimates of location data comprises:

developing estimates of location data for said stationary and moving tubulars for a particular time step from the image data utilizing a support vector machine learning technique, refining said estimates of location data through the use of a tree regression algorithm; and wherein the effect of the movement of said moving tubular relative to said stationary tubular on said estimates of location data is addressed by applying said estimates of location data to a bank of parallel Kalman filters, each of said Kalman filters being having varying noise terms, the output of each said Kalman filters resulting in differing estimates of location data for the stationary tubular and said moving tubular; and selecting from the differing estimates of location data produced by said parallel Kalman filters, a final estimate of location, the output which was most closely estimated the location data in an immediately prior time step.

4. The system of claim 1, wherein the histogram of oriented gradient training and recognition technique is a max-margin object detection technique that permits the detection of multiple tubulars within real time images.

5. A method for making threaded oilfield tubular connections on a drilling floor, the method comprising:

moving an oilfield tubular, said tubular having a threaded ends, from a tubular storage area and suspending the moving tubular in a vertical position above a vertical stationary downhole tubular suspended in a rotary table in a drill floor, the stationary tubular having thread connections on both ends, the uppermost thread connection of the stationary tubular capable of mating a lower thread connection of the moving tubular, by means of an automated tubular handling system;

capturing image information of the drilling floor, utilizing at least two imaging systems, each imaging system comprised of at least one color video camera and being radially offset from each other with respect to the rotary table;

transmitting the image information to an image processing system, the image processing system recognizing the moving and stationary tubulars utilizing a histogram of oriented gradient technique and generating position information for the moving and stationary tubulars in three dimensions;

transmitting the position information to the automated tubular handling system, the tubular handling system developing positioning instructions to bring the lowermost end of the moving tubular in alignment with the uppermost end of the downhole tubular and to lower the moving tubular to bring the moving and stationary tubulars into threaded contact;

creating a threaded connection between the moving tubular and the stationary downhole tubular by tightening said tubular threads using an automated hydraulic wrench system located on the drilling floor.

6. The method of claim 5, wherein the step of the image processing system recognizing and generating position information comprises:

utilizing a sliding window for an image data time step for each camera system; developing position information for the moving and stationary tubulars using a support vector machine training technique utilizing said histogram of oriented gradient; applying a regression tree algorithm to the position information to refine the position information; and combining the position information for the moving and stationary tubulars based on image data each camera system to create three dimensional position information.

7. The method of claim 6, wherein the step of developing position information further includes the step of providing the position information to a parallel set of Kalman filters, each filter having a different noise factor, each resulting in differing position information from each filter, and selecting from the set of differing position information that position information which most accurately determined the position information in an immediately prior time step.

8. A system for making tubular threaded connections on a drilling rig floor, the system comprising:

an automated tubular handling system for transporting a tubular from a tubular storage area proximate to said drilling floor, said automated tubular handling system being capable of orienting said tubular in a vertical position, said tubular having a thread connections on each end of said tubular, and moving said tubular in proximity to a stationary tubular vertically positioned in a rotary table in said drilling floor, said stationary tubular having thread connection on each end of said tubular, the thread connection on said stationary tubular uppermost end being capable of mating with the thread connection on the lowermost end of said moving tubular;

at least two imaging systems, each imaging system comprised of at least one camera, the imaging systems being radially offset from each other relative to the center of rotary table, each imaging system providing real time images of said stationary tubular and said moving tubular;

an image processing system that receives the real time images from the imaging systems, the image processing system applying a histogram of oriented gradient image analysis operating to detect the stationary and moving tubulars and generating real time estimates of location data for the stationary and moving tubulars in three dimensional space on the drilling floor;

transmitting the real time location data to the automated tubular handling system, said tubular handling system processing the real time location information to bring the moving tubular into vertical alignment with the stationary tubular, and lowering the moving tubular into threaded contact with the stationary tubular; and an automated torque wrench located on the drilling floor, said automated wrench being advanced from a position away from the rotary table towards the rotary table and into contact with the moving tubular and stationary tubular and applying torque to said tubulars to establish a threaded connection between said stationary tubular and moving tubular.

9. The system of claim 8, wherein each of said imaging systems is comprised of at least one color camera.

10. The system of claim 8, wherein the image processing system comprises:

applying a sliding window to said real time images and applying a support vector machine training and recognition technique for the recognition of said stationary and moving tubulars, and developing estimates of location data for said stationary and moving tubulars for a particular time step from the image data, refining said estimates of location data through the use of a tree regression algorithm;

and wherein the effect of the movement of said moving tubular relative to said stationary tubular on said estimates of location data is addressed by applying said estimates of location data to a bank of parallel Kalman filters, each of said Kalman filters being having varying noise terms, the output of each said Kalman filters resulting in differing estimates of location data for the stationary tubular and said moving tubular; and selecting from the differing estimates of location data produced by said parallel Kalman filters, a final estimate of location, the output which was most closely estimated the location data in an immediately prior time step.

11. A method for positioning oil field threaded tubulars in a drilling floor environment, the system comprising:

moving a tubular, said tubular having thread connections on each end, said tubular having thread connections on each end, by means of an automated tubular handling system from a tubular storage area proximate to said drilling floor, said automated tubular handling system being capable of orienting said moving tubular in a vertical position and in proximity to a stationary tubular, said stationary tubular having thread connections on each end, vertically positioned in a rotary table in said drilling floor, the uppermost end of said stationary tubular having a thread connection capable of mating with the thread connection on the lower end of the moving tubular;

capturing image data from at least two imaging systems, each imaging system comprised of at least one camera, the imaging systems being radially offset from each other relative to the center of rotary table, and each providing real time images of said stationary tubular and said moving tubular;

processing the image data from the imaging systems, the image processing applying a histogram of oriented gradient technique to detect the stationary and moving tubulars and generating real time estimates of location data for the stationary and moving tubulars in three dimensional space on the drilling floor; and transmitting the real time location data to the automated tubular handling system, said tubular handling system processing the real time location information to bring the moving tubular into vertical alignment with the stationary tubular, and lowering the moving tubular into threaded contact with the stationary tubular.

12. The method of claim 11, wherein step of capturing of image data by each of said imaging systems comprises using at least one color camera.

13. The method of claim 11, wherein the step of processing of image data system comprises:

using the histogram of oriented gradient information to a support vector machine training and recognition for the recognition of said stationary and moving tubulars, and developing estimates of location data for said stationary and moving tubulars for a particular time step from the image data, refining said estimates of location data through the use of a tree regression algorithm;

applying said estimates of location data to a bank of parallel Kalman filters, each of said Kalman filters being having varying noise terms, the output of each said Kalman filters resulting in differing estimates of location data for the stationary tubular and said moving tubular; and selecting from the differing estimates of location data produced by said parallel Kalman filters, a final estimate of location, the output which was most closely estimated the location data in an immediately prior time step.

14. The method of claim 11, wherein the histogram of oriented gradient training a recognition technique is a max-margin object detection technique that permits the detection of multiple tubulars within real time images.

* * * * *